US011463982B2

(12) United States Patent
Salt et al.

(10) Patent No.: US 11,463,982 B2
(45) Date of Patent: Oct. 4, 2022

(54) METHODS FOR IMPROVING SOURCE LOCALIZATION BASED ON TIME-OF-ARRIVAL MEASUREMENTS

(71) Applicant: CISCO SYSTEMS CANADA CO., Toronto (CA)

(72) Inventors: Joseph Eric Salt, Saskatoon (CA); Ha Hoang Nguyen, Saskatoon (CA)

(73) Assignee: CISCO SYSTEMS CANADA CO., Toronto (CA)

( * ) Notice: Subject to any disclaimer, the term of this patent is extended or adjusted under 35 U.S.C. 154(b) by 125 days.

(21) Appl. No.: 17/067,954

(22) Filed: Oct. 12, 2020

(65) Prior Publication Data
US 2021/0212015 A1 Jul. 8, 2021

Related U.S. Application Data

(60) Provisional application No. 62/957,834, filed on Jan. 7, 2020.

(51) Int. Cl.
*H04W 64/00* (2009.01)
*G01S 19/51* (2010.01)
(Continued)

(52) U.S. Cl.
CPC .......... *H04W 64/003* (2013.01); *G01S 19/46* (2013.01); *G01S 19/51* (2013.01); *G06N 7/005* (2013.01)

(58) Field of Classification Search
CPC ... H04W 64/00; H04W 64/003; G01S 5/0278; G01S 5/0252; G01S 19/46; G01S 19/51; G06N 7/005
See application file for complete search history.

(56) References Cited

U.S. PATENT DOCUMENTS 5,293,642 A * 3/1994 Lo .......................... H04W 64/00
455/456.2
5,615,175 A 3/1997 Carter et al.
(Continued)

FOREIGN PATENT DOCUMENTS

CN 103716264 A * 4/2014
CN 103747455 A * 4/2014
(Continued)

OTHER PUBLICATIONS

F.K.W. Chan et al., "Best linear unbiased estimator approach for time-of-arrival based localisation", IET Signal Process., doi: 10.1049/iet-spr:20070190, Jun. 6, 2008, vol. 2, No. 2, pp. 156-162.
(Continued)

*Primary Examiner* — Dung Hong
(74) *Attorney, Agent, or Firm* — Edell, Shapiro & Finnan, LLC

(57) ABSTRACT

A method is provided for geo-location of a wireless target device. The method is able to generate complete statistical information about the target device in the form of a joint probability density function of the target's location. The method includes obtaining time of arrival measurements associated with reception, at a plurality of receiver devices at known or measured locations, of one or more wireless transmissions made by a target device at a location that is unknown. Based on the time of arrival measurements, the method includes computing a joint probability density function that is descriptive of a probability that the target device is within any specified region. The method then involves applying the joint probability density function to a particular specified region to compute the probability that the location of the target device is within the particular specified region.

20 Claims, 6 Drawing Sheets

(51) Int. Cl.
*G01S 19/46* (2010.01)
*G06N 7/00* (2006.01)

(56) References Cited

U.S. PATENT DOCUMENTS

| | | | |
|---|---|---|---|
| 7,233,799 B2 | 6/2007 | Spain, Jr. | |
| 9,853,751 B2 | 12/2017 | Berscheid et al. | |
| 10,203,397 B2 | 2/2019 | Sendonaris et al. | |
| 10,419,137 B2 | 9/2019 | Berscheid et al. | |
| 2007/0121560 A1* | 5/2007 | Edge | H04W 64/00 370/338 |
| 2010/0295734 A1* | 11/2010 | Wu | G01S 5/0205 342/463 |
| 2013/0285855 A1* | 10/2013 | Dupray | G01S 19/48 342/451 |

FOREIGN PATENT DOCUMENTS

| | | | | |
|---|---|---|---|---|
| CN | 105792352 A | * | 7/2016 | H04W 64/00 |
| CN | 107801195 A | * | 3/2018 | H04W 16/18 |
| WO | WO-2013054088 A1 | * | 4/2013 | G01N 21/6458 |
| WO | WO-2017067479 A1 | * | 4/2017 | G01S 5/02 |

OTHER PUBLICATIONS

K. W. Cheung, "Least Squares Algorithms for Time-of-Arrival-Based Mobile Location", IEEE Transactions On Signal Processing, vol. 52, No. 4, Apr. 2004, 8 pages.

Y. T. Chan et al., "A Simple and Efficient Estimator for Hyperbolic Location", IEEE Transactions on Signal Processing, vol. 42, No. 8, Aug. 1994, 11 pages.

Benjamin Friedlander, "A Passive Localization Algorithm and Its Accuracy Analysis", IEEE Journal of Oceanic Engineering, vol. OE-12, No. 1, Jan. 1987, 12 pages.

Julius O. Smith, "The Spherical Interpolation Method of Source Localization", IEEE Journal of Oceanic Engineering, vol. OE-12, No. 1, Jan. 1987, 7 pages.

M. Sudhakara Reddy et al., "Passive Source Localization Employing Intersecting Spherical Surfaces from Time-of-Arrival Differences," IEEE Transactions on Acoustics, Speech, and Signal Processing, vol. ASSP-35, No. 8, Aug. 1987, 3 pages.

Julius O. Smith et al., "Closed-Form Least-Squares Sources Location Estimation from Range-Difference Measurements", IEEE Transaction on Acoustics, Speech, and Signal Processing, vol. ASSP-35, No. 12, Dec. 1987, 9 pages.

Ralph O. Schmidt, "A New Approach to Geometry of Range Difference Location", IEEE Transactions on Aerospace and Electronic Systems, vol. AES-8, No. 6, Nov. 1972, 15 pages.

Wade H. Foy, "Position-Location Solutions by Taylor-Series Estimation", IEEE Transactions on Aerospace and Electronics Systems, vol. AES-12, No. 2, Mar. 1976. 8 pages.

Predrag Radivojac et al., "Machine Learning Handbook", iu.instructure.com, Feb. 28, 2017, 120 pages.

Yubo Wang et al., "Location of Moving Targets in SubstationNon-Line-of-Sight Environment", Sensors, 19, 5321, doi:10.3390/s19235321, Dec. 3, 2019, 19 pages.

Yongsheng Yan et al., "TDOA-Based Source Collaborative Localization via Semidefinite Relaxation in Sensor Networks", Hindawi Publishing Corporation, International Journal of Distributed Sensor Networks, vol. 2015, Article ID 248970, http://dx.doi.org/10.1155/2015/248970, Aug. 17, 2015, 16 pages.

Xinya Li et al., "Contributed Review: Source-localization algorithms and applications using time of arrival and time difference of arrival measurements", Review of Scientific Instruments, 87, 041502, Apr. 25, 2016, 13 pages.

* cited by examiner

METHODS FOR IMPROVING SOURCE LOCALIZATION BASED ON TIME-OF-ARRIVAL MEASUREMENTS

CROSS REFERENCE TO RELATED APPLICATION

This application claims priority to U.S. Provisional Application No. 62/957,834, filed Jan. 7, 2020, the entirety of which is incorporated herein by reference.

TECHNICAL FIELD

The present disclosure relates to geo-location in Low-Power Wide-Area Networks (LPWANs). It is also applicable to any geo-location system that is based on time-of-arrival measurements of a signal transmitted by the source and collected at spatially-separated receivers.

BACKGROUND

Low-power wide-area networks (LPWANs) have recently emerged as a promising complementary communication solution for many Internet of Things (IoT) applications. LPWANs are designed to achieve large coverage ranges, extend battery lifetimes of end-devices, and reduce the operational cost of traditional cellular networks. By exploiting the sub-1 GHz unlicensed, industrial, scientific, and medical (ISM) frequency band and sporadically transmitting small packets at low data rates, these networks can be operated with very low reception sensitivities. LPWANs are expected to generate significant revenue from logistics, supply chain management, and personal IoT applications, where the location of objects, vehicles, humans, and animals is a valuable piece of information with many possible industry applications. In fact, the localization and tracking ability of LPWANs is regarded as an important feature to enable new IoT applications.

DESCRIPTION OF EXAMPLE EMBODIMENTS

Overview

Figure 1:
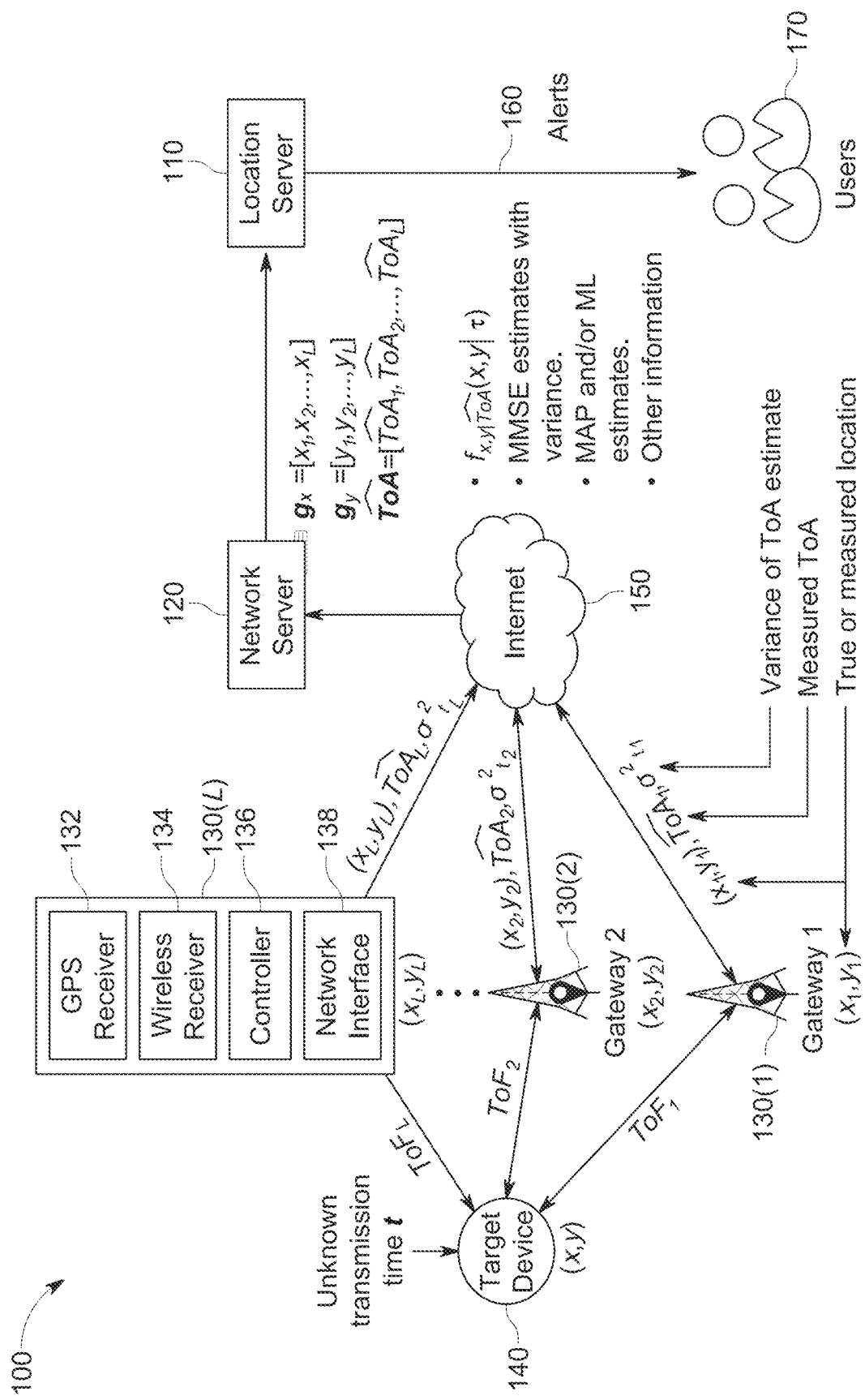
FIG. 1 is block diagram of a system configured to determine location information of a wireless target device, according to an example embodiment.

In one embodiment, a method is provided for geo-location of a wireless target device. The method is able to generate complete statistical information about the target device in the form of a joint probability density function of the target's location. The method includes obtaining time of arrival measurements associated with reception, at a plurality of receiver devices at known or measured locations, of one or more wireless transmissions made by a target device at a location that is unknown. Based on the time of arrival measurements, the method includes computing a joint probability density function that is descriptive of a probability that the target device is within any specified region. The method then involves applying the joint probability density function to a particular specified region to compute the probability that the location of the target device is within the particular specified region.

Example Embodiments

While different wireless technologies and standards have been developed for LPWANs, presented herein are embodiments that may be employed with the technology known as LoRa and Long Range Wide Area Network (LoRaWAN). LoRa is the physical-layer modulation technique, which is based on the principle of chirp spread spectrum and can provide long range communications with low power. On the other hand, LoRaWAN defines the communication protocol and system architecture for the network. The protocol and network architecture have an impact in determining the battery lifetime of a node (i.e., an end-device), the network capacity, the quality of service, the security, and the variety of applications served by the network.

Since global positioning system (GPS) chips have high cost and high power consumption, they are not suitable for IoT devices in general, and LoRa end-devices in particular. As such, localization of devices in LPWANs is typically achieved by using properties of the received signals and time-of-flight-based measurements. In the case of LoRaWAN, the protocol provides two methods for localization: one is based on received signal strength indication (RSSI) for coarse positioning, and the other one based on time-of-arrival (ToA) measurements for finer accuracy.

There are various techniques for LoRaWAN geo-location. While no public information is available about what algorithms are being currently used in practice, it appears that the geo-location solvers known in the art are all point estimators, which try to solve a set of nonlinear equations using the time-difference-of-arrival (TDoA) values obtained from the ToA measurements. Specifically, the difference in the time instants that a signal transmitted from an end-device arrives at a pair of gateways (also called anchors, with known locations), i.e., the TDoA, measures the difference in distance from the end-device to a pair of gateways. When the TDoA at a pair of gateways is known, the end-device is located on a hyperbola whose parameter is a function of the TDoA. With TDoA values from several different pairs of gateways, the end-device should be located on all hyperbolae. This means that the end-device should be located at the "center" of the intersections of these hyperbolae.

Unlike existing geo-location solvers, which only provide a single estimate (i.e., the point estimate) of the target's location, the methods presented herein provide for a more useful geo-location solver for LoRaWAN. Specifically, the location solver obtains a complete joint probability density function (pdf) of the target's location based directly on the time-of-arrival (ToA) measurements at known receiver (e.g., gateway) locations. The location solver presented herein is particularly useful since there is considerably more information in the joint pdf than can be provided by a point estimator or credible regions estimator. In fact, the joint pdf may be used to generate point estimates or credible regions, but not the opposite. To illustrate the point, consider the example where the target happens to be a LoRa sensor worn by a missing child. A point estimator would provide a good starting point for the search, but the contour lines defining credible regions that can be obtained from the joint pdf would be of great value in organizing a grid search for the child.

The location solver techniques herein, while described with reference to IoT devices and devices that employ the LoRa technology standard, are not limited to use with IoT devices and to the use of LoRa, chirp spread spectrum or any wireless communication technology or standard. In other words, these techniques may be used to locate a target wireless device that emits a wireless transmission (e.g., radio frequency or other wireless transmission) of any type. Moreover, the time of transmission of the wireless transmission(s) from the target device need not be known, and in most cases, is not known.

The methodology presented herein estimates location using statistics and probability theory. This method determines the probability that the target is in a particular region. This is done by first constructing an a posteriori joint probability density function (PDF). Then, to determine the likelihood that the target is in a particular region, the joint PDF is integrated over that region and that gives a probability that the target is in that region. The location server 110 can generate contour lines to indicate that the target is in different areas with a certain probability.

The techniques presented are based on determining a way to apply the concepts of an a posteriori probability density function to a wireless location problem such that it can be used to compute the probability that a source of a wireless signal is in a particular region.

Reference is now made to FIG. 1. FIG. 1 shows a system 100 according to an example embodiment. The system 100 includes a location server 110, a network server 120 and a plurality of gateways 130(1), 130(2), . . . 130(L) that serve as receiver devices at known locations. The gateways 130(1)-130(L) receive one or more wireless (e.g., radio frequency) transmissions from a target device 140 that is at an unknown location-a location to be determined. The target device 140 may be an IoT device, a mobile phone, or in general any radio frequency emitter that makes wireless emissions/transmissions.

The gateways 130(1)-130(L) may be in communication with the network server 120 by way of the Internet 150, or any suitable local area network (LAN) or wide area network (WAN). The gateways 130(1)-130(L) are at known geographic locations denoted as $(x_1, y_1)$-$(x_L, y_L)$.

The location server 110 is an application server that executes a location estimation algorithm based on measurements made by the gateways 130(1)-130(L) on reception of one or more wireless transmissions made by the target device 140. Thus, the inputs to the location estimation algorithm are the measured times of receptions of the multiple gateways that receive the one or more wireless transmissions from the target device 140. This is illustrated in FIG. 1, where the gateways 130(1)-130(L) and the target device 140 are assumed to lie on a planar surface. The surface locations of the gateways 130(1)-130(L) and target are indicated by $(x_\ell, y_\ell)$, $\ell = 1, 2, \ldots, L$, and $(x, y)$, respectively. As indicated in FIG. 1, the location of each gateway may or may not be known precisely. In other words, there may be an error in the measured location of each gateway. As described further below, the method presented herein can be extended to account for error in the measured location of each gateway, and the details for such computations are presented below under the heading Summary of Underlying Mathematical Derivation, sub-heading Considering Errors in the Measured Locations of Gateways.

The locations of the gateways 130(1)-130(L) may be determined through Global Positioning System (GPS) techniques or any other suitable techniques now known or hereinafter developed. In one example, and as shown in FIG. 1 for gateway 130(L), the gateways 130(1)-130(L) may include a GPS receiver 132, a wireless receiver (or transceiver) 134, a controller 136 and a network interface 138. The GPS receiver 132 enables communication with multiple GPS satellites in order for the gateway to determine its geographic location. The GPS receiver 132 may also serve to synchronize a clock of the gateway with a GPS clock, so that all of the gateways can be synchronized to the same clock, which has advantages for the time-of-arrival measurements.

The wireless receiver/transceiver 134 may be configured to receive and demodulate the transmissions from the target device 140 in order to determine a time-of-arrival of a received transmission from the target device 140. The wireless receiver/transceiver 134 may be embodied by one or more chipsets that include radio receiver circuitry, analog-to-digital converters, and demodulation logic that includes the capability to determine the time-of-arrival of a received transmission. Moreover, the wireless receiver/transceiver 134 may be configured to generate a measure of uncertainty or variance as to the time-of-arrival of a received transmission from the target device. This variance, denoted $\sigma_{t_\ell}^2$, is part of a capability of the gateway and many suitable techniques for generating the variance are known in the art, the details of which are therefore not provided herein. However, one factor in computing or outputting the variance associated with reception of a transmission from the target device may be the received signal strength of the transmission. A higher received signal strength generally indicates a lower variance, whereas a lower received signal strength may indicate a higher variance.

In addition, the wireless receiver/transceiver 134 may have transmit capabilities in the event that the target device 140 is enabled for two way communication, instead of just one-way communication in which the gateway is only receiving transmissions from the target device 140. In some embodiments, the gateways 130(1)-130(L) may serve as the wireless intermediary between the target device 140 and an entity (connected to the Internet 150) that consumes data collected by the target device 140, particularly when the target device 140 is connected to or associated with a sensor or other data collector device. The wireless transmissions from the target device 140 may carry payload/data that is destined for such an entity. In some embodiments, one or more of the gateways 130(1)-130(L) may be configured to transmit a signal to the target device 140 that causes the target device 140 to make one or more transmissions that are then received by the gateways 130(1)-130(L) and used for obtaining ToA measurements for location analysis by the location server 110.

The controller 136 performs overall control of the gateway, and in one form, may be a microprocessor that executes control software stored in memory. The network interface 138 is a network interface card or other similar network interface device that is configured to enable network communications with the network server 120.

The target device 140 may be battery-operated, and wakes up and transmits occasionally, and that transmission is received by the gateways 130(1)-130(L) at different locations. The target device 140 may be an IoT device, a mobile phone, or any source of a wireless transmission. The time that the target transmits the message is unknown, and in fact does not need to be known for the techniques presented herein. Because the time of transmission from the target is not known, then it is not possible to directly determine the time of flight of the transmission to each of the gateways. Only the ToA measurements at each of the gateways is known.

The gateways 130(1)-130(L) are synchronized to a GPS clock and can record an accurate time at which they receive messages from the target device 140. There is some measurement error at the gateways associated with the measured time of arrival at the various gateways. This measurement error is characterized by the aforementioned variance. The gateways embed the ToA measurements into messages that are sent to a network server 120, which then sends all the ToA measurements to the location server 110.

More specifically, the target device 140 sends transmissions at unknown transmission time t. The gateways 130(1)-130(L) have no knowledge about when the target device 140 sends a transmission. The time-of-flight (ToF) from the target device 140 to the respective gateway 130(1)-130(L), for a transmission is denoted $ToF_1, ToF_2, \ldots, ToF_L$.

The ToA measurements made by gateway $\ell$ are denoted by $\widehat{ToA}_\ell$, $\ell = 1, 2, \ldots, L$. The variance of the measurement error associated with a ToA measurement at a gateway $\ell$ is denoted as $\sigma_{t_\ell}^2$, for $\ell = 1$ to L. Thus, for a given reception of a wireless transmission from the target device 140, a gateway sends a measurement report message, via the Internet 150, to the network server 120. The measurement report message includes the location of the source gateway of the message and the ToA measurement. The measurement report message may further include a variance $\sigma_{t_\ell}^2$ for each ToA measurement as well. Thus, gateway 130(1) sends a measurement report message including its location $(x_1, y_1)$, its ToA measurement, $\widehat{ToA}_1$, and a variance, such that the measurement report message may be denoted as $(x_1, y_1)$, $\widehat{ToA}_1, \sigma_{t_1}^2$. Gateway 130(2) sends a measurement report message including its location $(x_2, y_2)$, its ToA measurement, $\widehat{ToA}_2$, and a variance, such that the measurement report message is denoted as $(x_2, y_2)$, $\widehat{ToA}_2, \sigma_{t_2}^2$ and gateway 130(L) sends a measurement report message including its location $(x_1, y_1)$, its ToA measurement, $ToA_L$, and a variance, denoted as $(x_L, y_L)$, $\widehat{ToA}_\ell, \sigma_{t_L}^2$.

The network server 120 controls and administers the gateways 130(1)-130(L), and in so doing, receives the measurement report messages from the gateways 130(1)-130(L). The network server 120 parses the measurement report messages from the gateways 130(1)-130(L) and sends to the location server 110 a vector of x-coordinates of the gateways, denoted $g_x = [x_1, x_2, \ldots, x_L]$, a vector of y-coordinates of the gateways, denoted $g_y = [y_1, y_2, \ldots, y_L]$, and a vector of ToA measurements, denoted $\widehat{ToA} = [\widehat{ToA}_1, \widehat{ToA}_2, \ldots, \widehat{ToA}_L]$.

The location server 110 applies a location algorithm to the content of the measurement report messages received from the gateways. Using the above input information, the algorithm computes the joint probability density function (pdf) of the location of the target device, denoted, in the example of a 2-dimensional location, by coordinates, x and y, by $f_{x,y|\widehat{ToA}}(x,y|\tau)$.

FIG. 1 further shows that the location server 110 may be configured to generate one or more alerts 160 based on the location probability or estimated location computed for the target device 140. Various users or entities 170 may subscribe to receive alerts from the location server 110 for a given target device 140, such as business owners, business operators, parents of children, equipment operators, military organizations, etc. As explained below in connection with FIG. 5, the location server 110 may generate an alert when the location probability of the target device 140 indicates that the target device 140 that is in a region that is restricted or prohibited, or conversely, that the target device has moved out of a particular region.

The definition of the relevant vectors are presented in Table I below under the heading Summary of Underlying Mathematical Derivation.

This joint pdf provides information on how likely (i.e., with what probability) the target device 140 would be found in a given region (for 3-dimensions) or a given area (for 2-dimensions). By contrast, conventional localization methods process the same input information but only provide one estimated location of the target (called a point estimate).

The method presented may take into account previously obtained information on the target device's location in the form of a priori distribution of the coordinates of the target device's location. Such a priori information could be provided by a separate measurement system or network, or by municipal laws (e.g., no targets in airports), or by the laws of physics (no targets in water). The method fully exploits the a priori information to improve the accuracy of the localization of the target device. In contrast, all conventional localization methods cannot take into account the a priori information of the target's location.

While useful for generating a probability that the target device is in a particular region or area, the joint pdf can also be used to generate point estimates, such as a minimum mean squared error (MMSE) estimate, a maximum a posteriori (MAP) estimate, or a maximum likelihood (ML) estimate. The computation of the joint pdf can be adapted to make use of a sequence of messages (multiple wireless transmissions from the target device over time) so that the localization accuracy can be continuously improved. This is not possible with conventional localization methods.

In the specific use-case of LoRaWAN, the algorithm can work with existing LoRaWAN infrastructure and only involves a change at the location server 110.

As explained above, there are two paradigms for localization: point estimation and region estimation. Each has its advantages. Point estimation provides estimates of the coordinates of the target, whereas region estimation, more specifically Bayesian region estimation, calculates the probability the target is in a specified region or area. Within the realm of localization, point estimation has been researched extensively, while region (area) estimation has not.

There are two types of "region estimation" that provide similar information, but the analyses are very different. One type uses frequentist statistics, meaning the analysis is based on point estimates from a repeated trial, to find a region called the confidence region. If an infinite number of point estimates were used to find the confidence region then the probability the next point estimate falls into the confidence region would be the specified confidence level.

The other type uses Bayesian statistics to find the probability the target (not a point estimate of the target's location) is in a specified region, called the credible region. This involves finding the a posteriori pdf and then integrating it over the credible region to get the probability.

There are two salient differences between the two region estimators described above. The first type specifies the confidence level and finds the confidence region. The second type specifies the credible region and finds the probability. The first requires a large number of transmissions from the target to find the confidence region. The second needs only one transmission to find the probability.

One approach to localizing a radiating source in the point estimation paradigm is to solve a system of nonlinear equations that link the ToAs or TDoAs to the location of the source. For example, in the case where the measurements are TDoAs, the equations have the form:

$$\phi_\ell(x_\ell, x_R, x) = b_\ell, \quad \ell = 1, 2, \ldots, L \quad (A)$$

where x is a vector containing the unknown coordinates of the target device, $x_\ell$ is a vector containing the known coordinates of receiver $\ell$ ($\ell = 1, \ldots, L$), $x_R$ is a vector containing the known coordinates of the reference receiver and $b_\ell$ is the measured TDoA at receiver $\ell$ with respect to receiver R. In the case where the ToAs are measured directly, the reference sensor is not needed so vector $x_R$ is removed from the arguments of functions $\phi_\ell(\bullet)$ and $b_\ell$ becomes the measured ToA at receiver $\ell$.

One way to solve equation (A) is to choose the coordinates of the target device to make the left side of equation (A) agree with the right side of equation (B) in the least squared (LS) error sense. Most LS error algorithms first translate the basic equations given by equation (2) to the more general set of equations given by:

$$\sum_{\ell=1}^{L} w_{j,\ell} \phi_\ell(x_\ell, x_R, x) = \sum_{\ell=1}^{L} w_{j,\ell} b_\ell, \quad \ell = 1, 2, \ldots, L \quad (B)$$

where $w_{j,\ell}$ are weighting factors equal to the {j, $\ell$}th element of the square root of the inverse of the covariance matrix of measurements $[b_1, b_2, \ldots, b_L]$. The translation from the basic to the more general set of equations may be done to make the LS error estimator approximate a minimum mean squared error (MMSE) estimator.

The location methodology presented herein involves the aforementioned second type of region estimation by providing the a posteriori pdf. The approach taken is to treat the right side of equations (A) and (B) as random variables and use probability theory to compute the Bayesian a posteriori density given measurements {$b_1, b_2, \ldots, b_L$}. The left side of the equations are treated as random variables. The techniques presented herein involve finding the true a posteriori pdf, which means the equations are not linearized.

Once the a posteriori density function is obtained, point estimates like the MMSE and the maximum a posteriori (MAP) estimates can be calculated. However, the a posteriori pdf is of far more value than any point estimator.

The value of the a posteriori pdf is that it can be used to find the probability that the target is in a specified area. The volume under the a posteriori pdf supported by an area in the x-y plane is the probability that the target is in that area. For example, a company that leases skateboards or (any other portable "people-mover" devices) needs to locate skateboards abandoned by delinquent customers. Suppose the skateboards are equipped with LoRaWAN sensors. The variance on the ML estimator could be too large for using it to pinpoint the location. In that case the ML estimate could serve as a starting point for the search. However, if the a posteriori pdf was known, then contour lines and the probabilities that the target is within them could be plotted on a map and used to organize an efficient search.

Set forth below are the statistical methods used and developed for this algorithm. Reference is continued to be made to FIG. 1.

It should be noted that the message, or more generally, the one or more wireless transmissions from the target device 140, include some frame structure known to the gateways, such as a frame preamble or some other portion of a message. The a priori knowledge may be obtained because the gateways 130(1)-130(L) are configured to receive and process transmissions from the target device 140, or the gateways 130(1)-130(L) may learn characteristics about some portion of wireless transmissions received from the target device by receiving such wireless transmissions over time.

Under the scenario that the locations of the gateways 130(1)-130(L) are determined exactly (i.e., without any errors), a ToA measurement at each gateway is a sum of three quantities: (i) the time that the message is transmitted at the target device, (ii) the time of flight, and (iii) the measurement error at each gateway. Of course none of these quantities are known and they are modelled in a statistical method as follows.

(i) The time that the target transmits the message is modelled as a Gaussian random variable with a mean of zero and a variance that tends to ∞. This is reasonable to capture the fact that the transmit time is completely unknown.

(ii) The time of flight from the target to each gateway depends on the length of the propagation path. This quantity is unknown, but directly related to the location of the target (unknown) and the location of the gateway.

(iii) The measurement error at each gateway is a sum of two types of errors: The random error introduced in the process that attempts to synchronize the gateway's clock to the GPS satellites' clocks, and the error due to Johnson noise in the receiver of the gateway, blurring the point in time a message is received. In this method, the measurement noise is also modelled as a zero-mean Gaussian random variable with a known variance (this is usually one of specifications for the accuracy of ToA measurements by any commercial gateway).

Having established the model of each ToA measurement (as a sum of unknown/random quantities described above), the method applies Bayes theorem to first obtain the conditional joint density of three unknown parameters (random variables): the x and y-coordinates of the target, and the time t when the target transmits the message.

In the final step, the method obtains the joint probability density function of the x and y-coordinates of the target by marginalizing (i.e., integrating) over the distribution of the transmit time t. The integration over t can be performed symbolically to arrive at a compact, easy-to-evaluate expression for the joint pdf. For the case that the locations of the gateways are known precisely, the expression of the a posteriori joint pdf is $$f_{x,y|\tau}(x, y | \tau) = \frac{e^{-\frac{\gamma}{2}} f_{x,y}(x, y)}{\int_{-\infty}^{\infty} \int_{-\infty}^{\infty} e^{-\frac{\gamma}{2}} f_{x,y}(x, y) dx dy} \quad (C)$$

where γ is computed as:

$$\gamma = \sum_{\ell=1}^{L} \frac{\left(\tau_\ell - \sqrt{(x_\ell - x)^2 + (y_\ell - y)^2}/c\right)^2}{\sigma_{\tau_\ell}^2} - \sigma^2 \left(\sum_{\ell=1}^{L} \frac{\tau_\ell - \sqrt{(x_\ell - x)^2 + (y_\ell - y)^2}/c}{\sigma_{\tau_\ell}^2}\right)^2 \quad (D)$$

where (x,y) are the coordinates of the target device, $\tau_\ell$ is the measured ToA and $\sigma_{\tau_\ell}^2$ is a variance of the ToA measurement at a respective gateway, $\ell$.

The details associated with the statistical and mathematical methods to derive this equations (C) and (D) are set forth below under the heading Summary of Underlying Mathematical Derivation.

The denominator on the right side of (C) is a constant that makes the volume under $\exp(-\gamma/2)f_{x,y}(x, y)$ equal to 1. The double integral that produces the constant most likely is computed numerically.

The following is provided to describe how to obtain point estimates from equation (C). However, it is reiterated that this does not imply the main objective of the methodology presented herein and the a posteriori pdf was found solely as a means to obtain the MMSE and MAP or ML estimates. In fact, the a posteriori pdf is of far more value than any point estimate as it can be used to compute the probability of any credible region.

The MMSE estimate for x(ζ) given the observation τ of ToA(ζ) is the conditional mean:

$$x_{MMSE}(\zeta) = E[x(\zeta) | \tau] = \int_{-\infty}^{\infty} x \int_{-\infty}^{\infty} f_{x,y|\text{ToA}}(x, y | \tau) dy dx \quad (E)$$

Substituting equation (C) for the conditional joint density produces:

$$x_{MMSE}(\zeta) = \frac{\int_{-\infty}^{\infty} x \int_{-\infty}^{\infty} e^{-\frac{\gamma}{2}} f_{x,y}(x, y) dy dx}{\int_{-\infty}^{\infty} \int_{-\infty}^{\infty} e^{-\frac{\gamma}{2}} f_{x,y}(x, y) dx dy} \quad (F)$$

where $f_{x,y}(x, y)$ is the a priori pdf and γ is given in equation (D). The MMSE estimate for other coordinates, e.g., y(ζ) and z(ζ) are computed in a similar way.

The integrals on the right side of equation (F) are quite complex and most likely need to be computed numerically.

Maximum a posteriori (MAP) estimates can be obtained without numerical integration. They are the values of x and y that jointly maximizes equation (C). In the special case where the a priori joint density $f_{x,y}(x, y)$ is constant over the region of x and y where $e^{-\gamma/2}$ is non-zero, it can be taken outside the double integration in the denominator and cancel with the same term in the numerator. In this case $e^{-\gamma/2}$ is both the MAP function and ML function for x(ζ) and y(ζ) and the MAP estimator is also the ML estimator.

Since $e^{-\gamma/2}$ is monotonic increasing with $-\gamma$, the values of x and y that maximize $e^{-\gamma/2}$ also maximize $-\gamma$. Therefore, the ML estimates are the values of x and y that maximize $-\gamma$, or minimize γ. Since γ is a complicated function of x and y, the ML estimates for x(ζ) and y(ζ) may be computed numerically using a hill climbing or valley descending algorithm.

The computation of equation (C) can be generalized to a 3-dimensional space, where the gateways and the target device have 3 coordinates (x, y and z), where z is the third coordinate of the target device's location and $z_\ell$, $\ell = 1, 2, \ldots, L$, are the third coordinates of the gateway's locations. The 3-dimensional a posteriori probability density function is given by:

$$f_{x,y,z|\text{ToA}}(x, y, z | \tau) = \frac{e^{-\frac{\gamma}{2}} f_{x,y,z}(x, y, z)}{\int_{-\infty}^{\infty} \int_{-\infty}^{\infty} \int_{-\infty}^{\infty} e^{-\frac{\gamma}{2}} f_{x,y,z}(x, y, z) dx dy dz} \quad (G)$$

where $f_{x,y,z}(x, y, z)$ is the a priori density of the target's coordinates and, for the 3-dimensional space, and γ is computed as:

$$\gamma = \sum_{\ell=1}^{L} \frac{\left(\tau_\ell - \sqrt{(x_\ell - x)^2 + (y_\ell - y)^2 + (z_\ell - z)^2}/c\right)^2}{\sigma_{\tau_\ell}^2} - \sigma^2 \left(\sum_{\ell=1}^{L} \frac{\tau_\ell - \sqrt{(x_\ell - x)^2 + (y_\ell - y)^2 + (z_\ell - z)^2}/c}{\sigma_{\tau_\ell}^2}\right)^2 \quad (H)$$

While equation (G) provides a 3-dimensional a posteriori pdf, it also provides a 2-dimensional a posteriori pdf that is better than equation (C). In general, equation (G) is reduced to two dimensions by setting z to be a function of x and y. Therefore, equation (G) can generate a 2-dimensional a posteriori pdf for a target that is known to sit on a surface that can be expressed as a function of x and y. In fact, equation (H) can be reduced to (D) by setting z as well the vertical coordinates of all gateways to 0. However, leaving the vertical coordinates of the gateways as their true heights will generate a more accurate 2-dimensional a posteriori pdf than equation (C). The reason is that by assuming all the gateways are in the same horizontal plane introduces a bias in the time-of-flight equations and thereby into the estimates.

The method can be extended to a scenario that the location of each gateway is not known precisely, i.e., there is an error in the measured location of each gateway. There are two components in this error: (a) one error that is common to all gateways and is due to the variation in the orbits of the GPS satellites, and (b) random error specific to the measurements of the x and y co-ordinates of each gateway. For such an extension, the method makes no assumption about the first error, but assumes that the second error component is a zero-mean Gaussian random variable with a known variance.

With the above model of the gateway's location error, the methodology presented under the heading Summary of Underlying Mathematical Derivation shows that the gateway's location error introduces an additional error term to each ToA measurement. The fourth error term is interpreted as the error in the time-of-flight measurement and is modelled as a zero-mean Gaussian random variable with a known variance. The details associated with the statistical and mathematical methods to derive the a posteriori pdf are set forth below under the heading Summary of Underlying Mathematical Derivation, sub-heading Considering Errors in the Measured Locations of Gateways.

Figure 2:
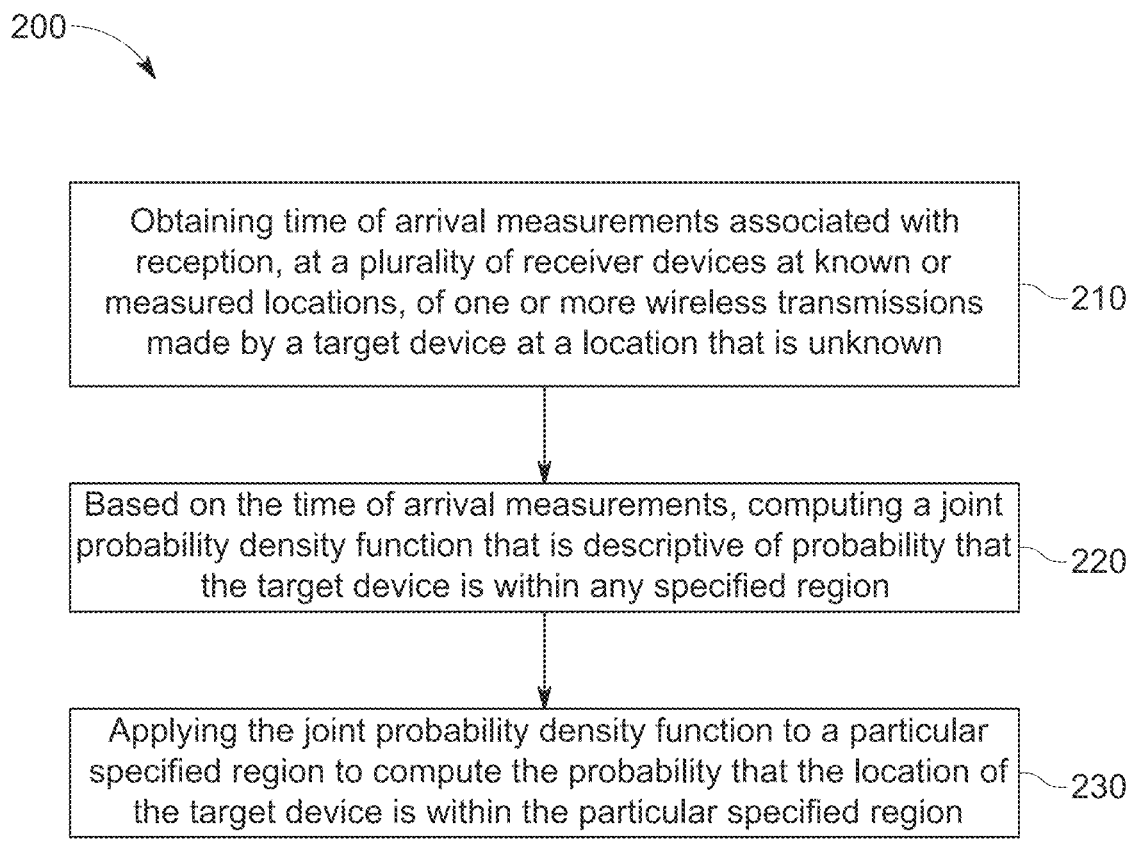
FIG. 2 is a flow chart depicting a method for deriving location information for a target device, according to an example embodiment.

Reference is now made to FIG. 2. FIG. 2 provides a flow chart depicting operations of a method 200 for determining a probability that the location of a target device is within a specified region. Reference is also made to FIG. 1 for purposes of the description of FIG. 2. At operation 210, the method 200 includes obtaining time of arrival measurements associated with reception, at a plurality of receiver devices at known locations, of one or more wireless transmissions made by a target device at a location that is unknown. The receiver devices are, for example, the gateways 130(1)-130 (L) depicted in FIG. 1. In one example, the one or more wireless transmissions from the target device are chirp spread spectrum transmissions. Furthermore, in one example, the one or more wireless transmissions are formatted in accordance with a LoRaWAN protocol.

As described herein, the target device may be associated with one or more of: an object, a person, an animal or a vehicle.

The obtaining operation 210 may include obtaining the time of arrival measurements for a plurality of wireless transmissions made by the target device that are received by a plurality of receiver devices at known or measured locations. Further, the computing operation 220 may include updating the joint probability density function after each of the plurality of wireless transmissions.

Figure 3:
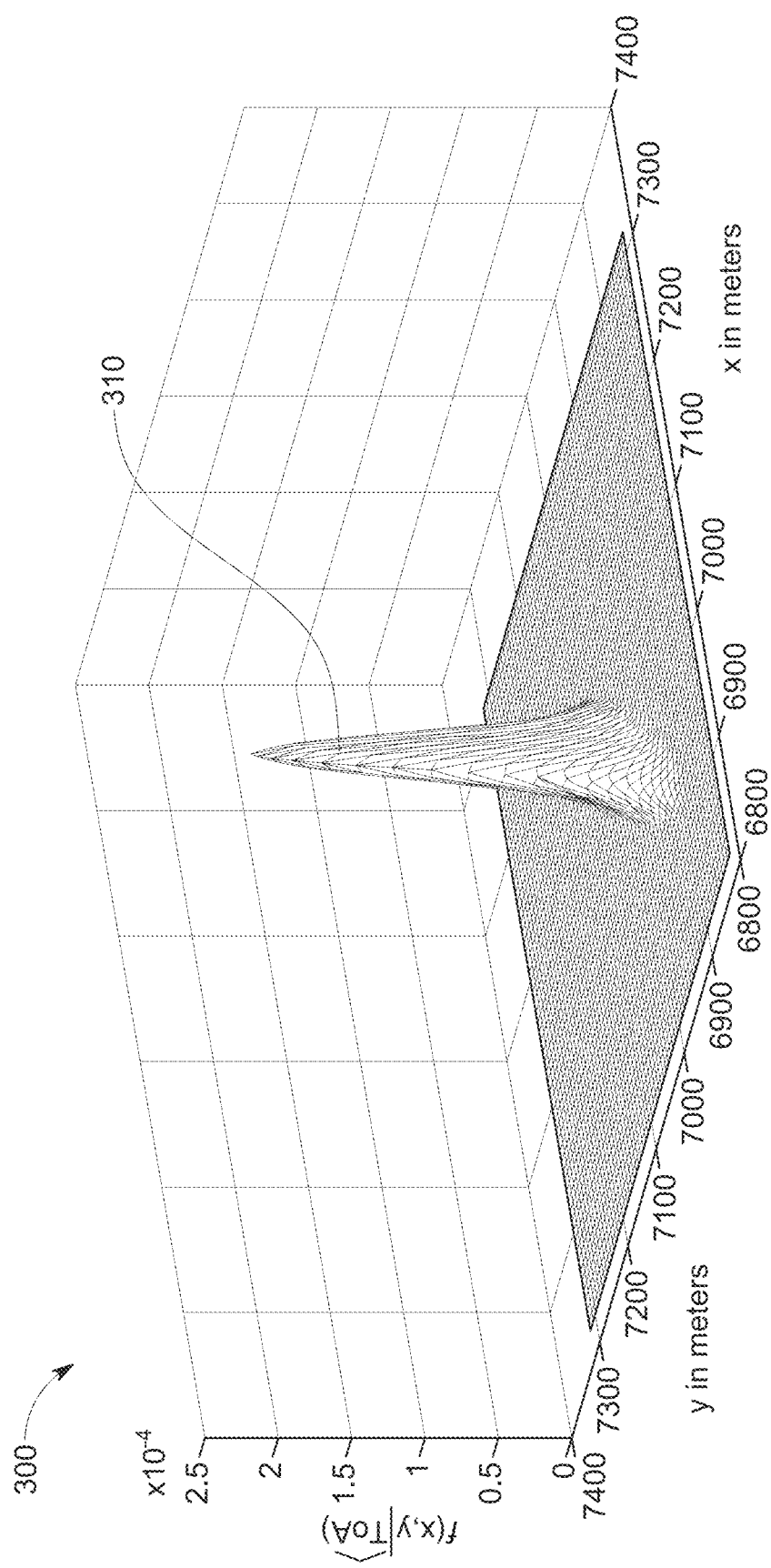
FIG. 3 is a diagram depicting an example plot of a joint probability density function that is generated according to the techniques presented herein.

The method 200 may further include generating a map showing a plurality of regions and including indications of a probability that the target device is within a corresponding one of each of the plurality of regions. FIG. 3, described below, is an example of such a map.

At 220, the method 200 includes computing, based on the time of arrival measurements, a joint probability density function that is descriptive of probability that the target device is within any specified region. As described above, the joint probability density function may be an a posteriori probability density function.

At 230, the method 200 includes applying the joint probability density function to a particular specified region to compute the probability that the location of the target device is within the particular specified region. As described in more detail below, the operation 230 of applying the joint probability density function to a particular specified region may involve integrating the joint probability density function over a domain that defines the particular specified region. Moreover, the domain that defines the particular specified region may correspond to a range of values of one or more of x, y and z coordinates.

As explained above, the method 200 may further include one or more of: (a) obtaining a maximum a posteriori (MAP) estimate of the location, which corresponds to a peak of the joint probability density function; or (b) obtaining a minimum mean squared error (MMSE) estimate, which corresponds to a center of mass of the joint probability density function; or (c) obtaining a maximum likelihood (ML) estimate, which corresponds to a location of the peak of the join probability density function in a special case that prior to the one or more transmissions by the target, no information on the location of the target was available.

In one example, and as described in more detail below in connection with FIG. 5, the particular specified region is, or identifies, a restricted region where it is desirable for the target device not to go. In this case, an alert may be generated when the probability that the target device is in the particular specified region is greater than a threshold. Conversely, the particular specified region may be a region where the target device is permitted and an alert may be generated when the probability that the target device is outside the particular specified region is greater than or less than a threshold.

Reference is now made to FIG. 3. FIG. 3 illustrates an example of a three-dimensional plot 300 of a joint probability density function. In other words, the plot 300 shown in FIG. 3 is generated using the computation of equation (4) based on ToA measurements made by a plurality of gateways from a wireless transmission received from a target device. As depicted in FIG. 3, the joint probability density function 310 in this particular example is "tent" shaped. Contour lines on the joint probability density function 310 provide credible regions.

To determine the probability of the target device being located within a particular specified region, such as a two-dimensional area specified by ranges of x and ranges of y, the computation involves determining the area under joint probability density function 310 for those ranges of x and ranges of y that describe the particular specified region (a 2-dimensional area). For example, FIG. 3 shows the probability that the target device is located within an area where x is in the range of 6900-7100 and where y is in the range of 6900-7000, is much greater than the probability that the target device is within an area where x is less than 6900 and greater than 7100 and y is less than 6900 and greater than 7100.

By obtaining multiple measurements from the target device, the method can generate a tighter joint probability density function, which can achieve a more reliable indication of the location probability of the target device in a particular region. The shape of the joint probability density function volume largely depends on how spread out the gateways are that receive the transmissions from the target device. However, even if the joint probability density function results in a very wide/unreliable/spread out volume, that can still be useful.

Figure 4:
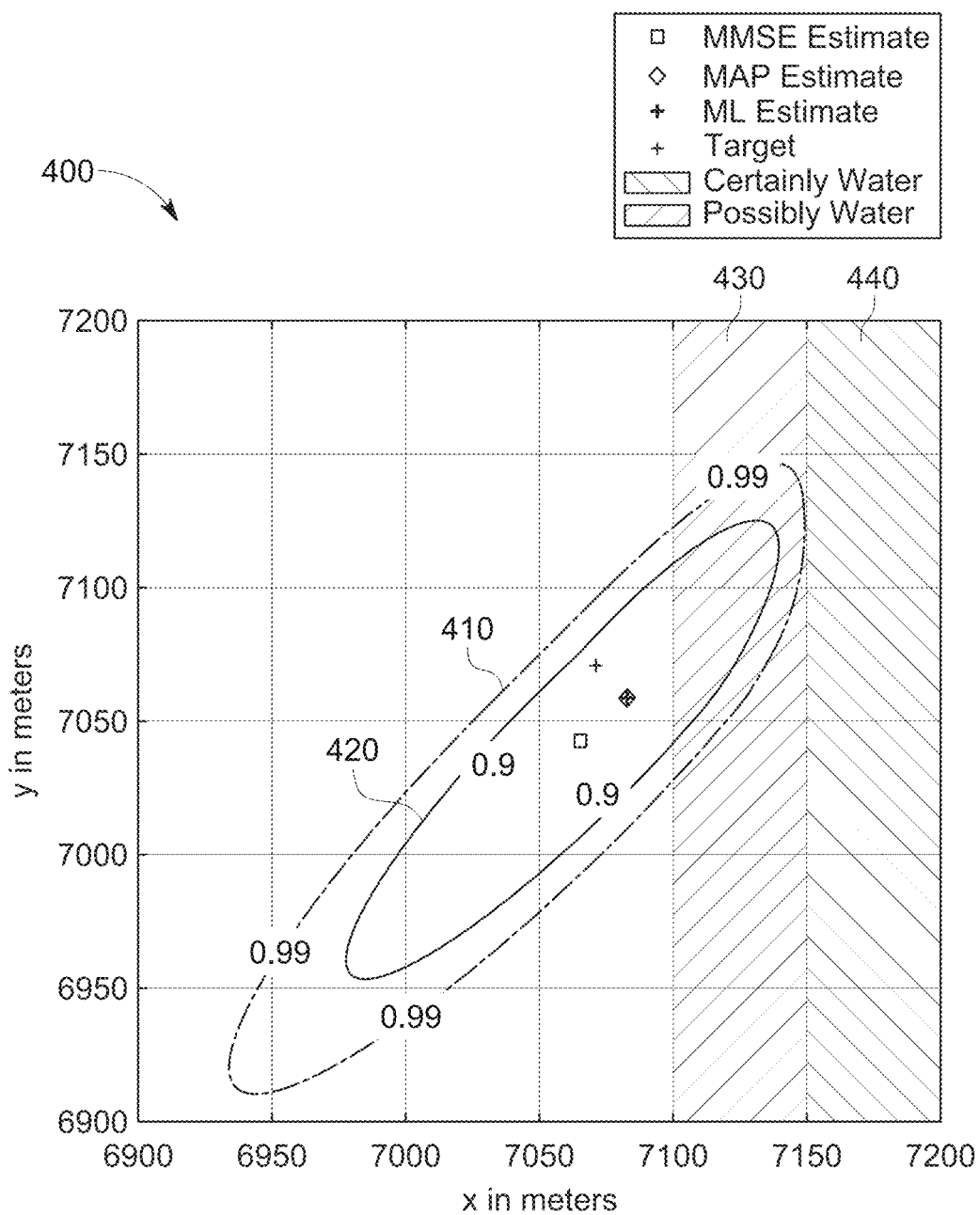
FIG. 4 is an example of a map that is generated to illustrate the probability that the target device is within a particular region, according to an example embodiment.

Two credible regions, as well as the MMSE and MAP estimates for the joint probability density function 310, are shown in FIG. 4. FIG. 4 shows a map 400 that shows examples of two credible regions 410 and 420 and point estimates of the target device when it is in the vicinity of a body of water, as an example. FIG. 4 essentially shows contour lines corresponding to areas under the joint probability density function 310 shown in FIG. 3. Credible region 410 indicates that there is a probability of 0.99 that the target device is within that area. Credible region 420, which is within credible region 410 (only as an example) indicates that there is a probability of 0.9 that the target device is within that area. The asymmetry of the contour lines indicates that the a priori density has changed the a posteriori probability density function and that the probability density function is not jointly Gaussian.

FIG. 4 shows area 430 that is possibly associated with a body of water and area 440 that is certainly associated with a body of water. In other words, map 400 is associated with a geographical area that borders a body of water, such as a lake, ocean, river, etc.

Figure 5:
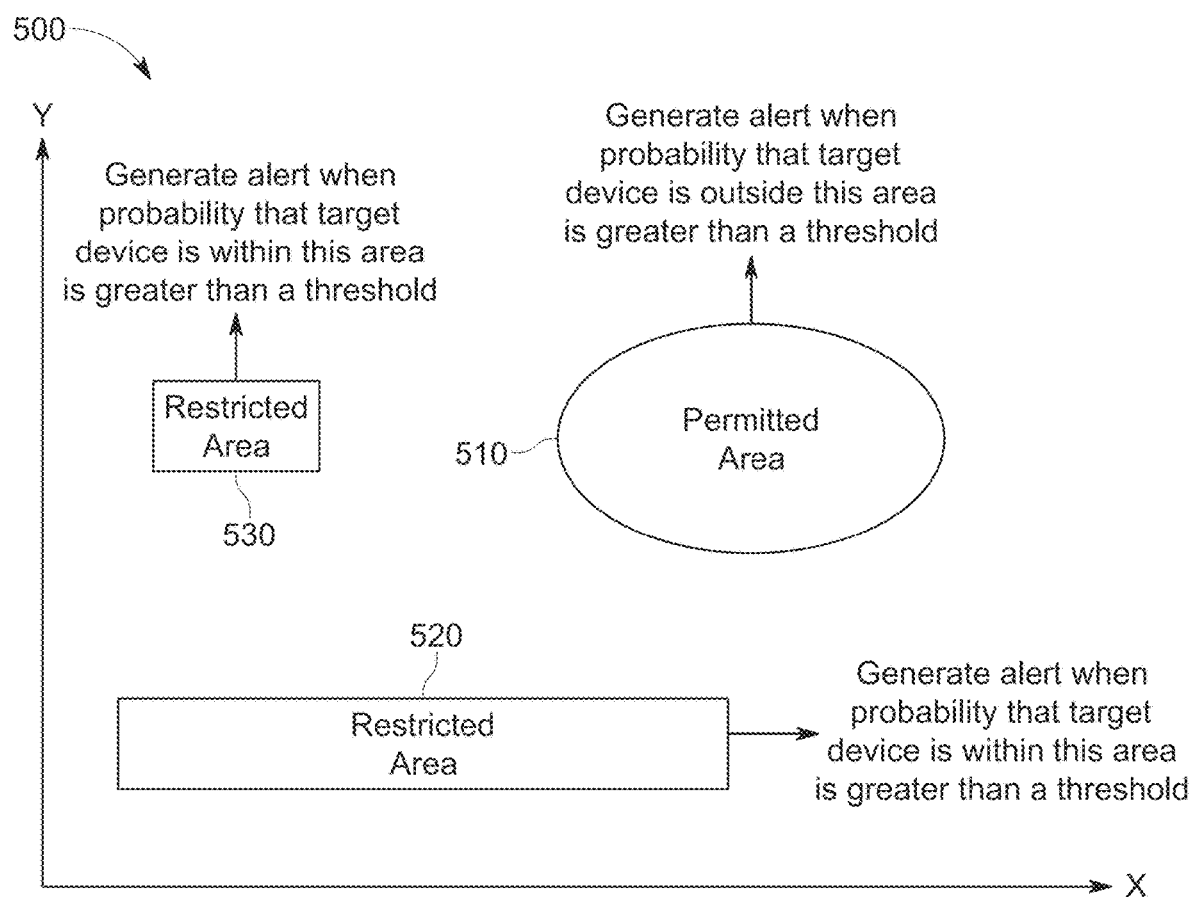
FIG. 5 is a diagram illustrating a map that shows variations of regions that may be configured to generate alerts when/if the target device enters or leaves a particular specified region, according to an example embodiment.

Reference is now made to FIG. 5 to describe examples of further use cases of the location methodology presented herein. Reference is also made to FIG. 1 for purposes of the description of FIG. 5. FIG. 5 shows a plot of a map 500 in the x-y plane and showing overlaid on the map indications of a permitted area 510 and two restricted areas 520 and 530.

The permitted area 510 is an area where a particular target device whose location is tracked is permitted to be located such that the location server 110 would generate an alert when the probability that the target device is outside area 520 is greater than a threshold, such as 0.9. This may be particularly useful when the target device is a sensor attached to an animal (or a person), or even a vehicle, and it is desirable to know if the sensor has left a certain area. A configuration would be set in the location server 110 that describes the area 510 and the location server 110 would periodically update the location of the target device 140 based on transmissions received from the target device 140 to determine if the probability of the target device 140 is outside area 510 by at least a certain threshold. Conversely, the location server 110 may compute a probability that the target device is within the area 510 and generate an alert when that probability drops below a certain threshold.

The restricted areas 520 and 530 may be areas where it is desirable to know if a vehicle, person or animal, on which a sensor is mounted, has entered. As one example, area 520 may be a runway at an airport where it is important to know if a land-vehicle has entered that area, which could present risk of collision with an aircraft.

The location server 110 would continuously update the location of the target device 140 and generate an alert when the probability that the target device 140 is within area 520 or area 530 is greater than a predetermined threshold, such as 0.85. The alert trigger threshold may be different for area 520 than for area 530.

Figure 6:
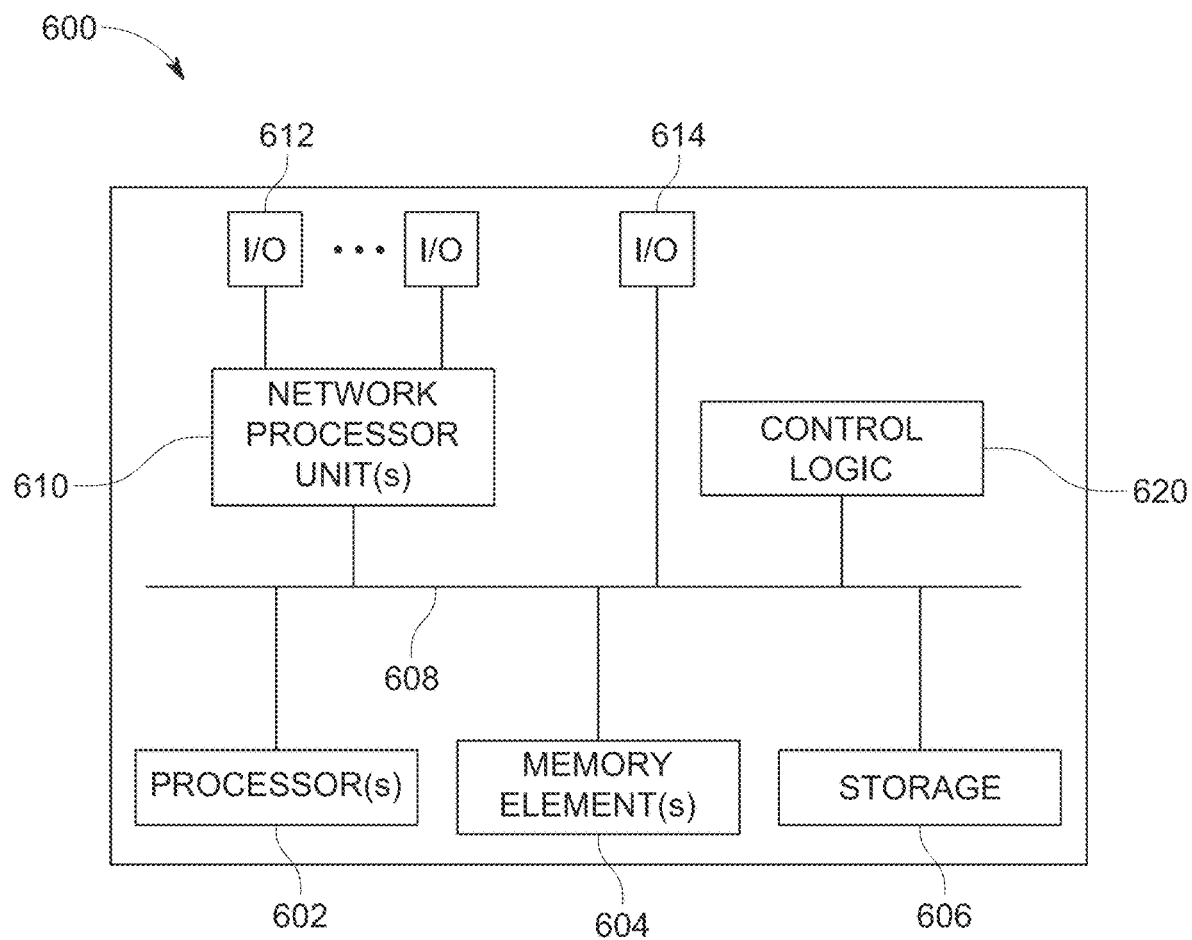
FIG. 6 is a block diagram of a computing device that may be configured/programmed to perform the location techniques described herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Presented herein is a method for geo-location. There are several key advantages. First, the proposed method is able to generate a complete statistical information about the target in the form of a joint pdf of the target's coordinates. Such joint pdf contains considerably more information than any point estimator or confidence regions estimator. Second, the proposed method can take into account measurement errors of the locations of the gateways. Third, the method can incorporate the a priori distribution of the coordinates of the target's location. Fourth, point estimates, such as MMSE and ML estimates, can also be obtained from the joint pdf. Fifth, the proposed method can be easily adapted to make use of the times-of-arrival from a sequence of messages to improve localization accuracy.

In summary, in one form, a method is provided comprising: obtaining time of arrival measurements associated with reception, at a plurality of receiver devices at known or measured locations, of one or more wireless transmissions made by a target device at a location that is unknown; based on the time of arrival measurements, computing a joint probability density function that is descriptive of a probability that the target device is within any specified region; and applying the joint probability density function to a particular specified region to compute the probability that the location of the target device is within the particular specified region.

In another form, a system is provided comprising: a plurality of receiver devices at known or measured locations, and configured to generate time of arrival measurements associated with reception of one or more wireless transmissions made by a target device at a location that is unknown; a server configured to be in network communication with the plurality of receiver devices, and to receive the time of arrival measurements from the plurality of receiver devices, wherein the server is configured to: based on the time of arrival measurements, compute a joint probability density function that is descriptive of a probability that the target device is within any specified region; and apply the joint probability density function to a particular specified region to compute the probability that the location of the target device is in the particular specified region.

In still another form, one or more non-transitory computer readable storage media are provided, encoded with instructions that, when executed by one or more processors, cause the one or more processors to perform operations including: obtaining time of arrival measurements associated with reception, at a plurality of receiver devices at known or measured locations, of one or more wireless transmissions made by a target device at a location that is unknown; based on the time of arrival measurements, computing a joint probability density function that is descriptive of a probability that the target device is within any specified region; and applying the joint probability density function to a particular specified region to compute the probability that the location of the target device is within the particular specified region.

Summary of Underlying Mathematical Derivation

Mathematical Derivation for 2D Localization

This section summarizes the mathematical derivation for the a posteriori pdf of the target's location on a plane (i.e., 2D localization) under the assumption that the locations of the gateways are measured precisely (i.e., without any errors).

The fundamental random variables (RVs) that arise from the physics of the localization problem and are needed in the development of the a posteriori pdf are described below.

$t(\zeta)$: This is the time that the target transmits the message.
  $t(\zeta)$ is independent of all other RVs. Its probability density function is assumed to be Gaussian with a mean of zero and a variance that tends to $\infty$.

$x(\zeta), y(\zeta)$: These two RVs are the x and y co-ordinates of the target. They are assumed to be independent of each other and all other RVs. They are also assumed to be zero-mean Gaussian RVs with variances that tend to $\infty$.

$\Delta T^{\ell}(\zeta)$: This is the error in measuring the time a message arrives at Gateway $\ell$. These RVs represent the sum of two types of error:
  1) The random error introduced in the process that attempts to synchronize the gateway's clock to the GPS satellites' clocks, and
  2) The error due to Johnson noise in the receiver blurring the point in time a message is received.

There are L such random variables. They are assumed to be mutually independent and also independent of all other fundamental random variables. They are assumed to be zero-mean Gaussian RVs with possibly different variances, denoted $\sigma_{t_\ell}^2$. The variances of these RVs are calculated in the gateways at the time a message is received and inserted into the message sent to the network server.

The times of flight from the target to the gateways depend on the lengths of the propagation paths. For a line-of-sight (LoS) path the RV describing the time of flight from the target to Gateway $\ell$ is denoted as $ToF_\ell(\zeta)$ and related to other RVs as:

$$ToF_\ell(\zeta) = \frac{\sqrt{(x_\ell(\zeta) - x(\zeta))^2 + (y_\ell(\zeta) - y(\zeta))^2}}{c}, \quad (1)$$

where $c=3\times10^8$ m/s is the speed of light.

TABLE I

Definition of relevant vectors.

| Vector | Description | Definition |
|---|---|---|
| ToA ($\zeta$) | Vector of RVs representing the times of arrival at L gateways in the absence of all measurement errors | ToA ($\zeta$) = [ToA$_1$ ($\zeta$), ..., ToA$_L$($\zeta$)]$^T$ |
| $\widetilde{ToA}(\zeta)$ | Vector of RVs representing the times of arrival at L gateways with measurement errors | $\widetilde{ToA}(\zeta) = [\widetilde{ToA}_1(\zeta), ..., \widetilde{ToA}_L(\zeta)]^T$ |
| $\tau$ | Vector of RVs representing the measured values of the times of arrival at L gateways. This vector is an observation of $\widetilde{ToA}(\zeta)$, i.e., $\tau = \widetilde{ToA}(\zeta)$ | $\tau = [\tau_1, ..., \tau_L]^T$ |

The time stamp inserted in the message by Gateway $\ell$ will be the time the message arrives at Gateway $\ell$. This time is referred to as the Time-of-Arrival (ToA). The set of possible measurements of the random variable representing all of the times-of-arrivals at Gateway $\ell$ is symbolized by the random variable $\widetilde{ToA}_\ell(\zeta)$. This random variable is related to other RVs as:

$$\widetilde{ToA}_\ell(\zeta) = t(\zeta) + ToF_\ell(\zeta) + \Delta T_\ell(\zeta). \quad (2)$$

There are three parameters that are neither known nor measured, but are related. These three parameters are modeled as RVs $r(\zeta)$, $y(\zeta)$ and $t(\zeta)$. The a posteriori joint density of interest is that for $x(\zeta)$ and $y(\zeta)$, but in this case the conditional joint density for all three RVs must be obtained and then integrated over t where t is the variable in the argument of the density function for RV $t(\zeta)$, to produce the a posteriori pdf of $x(\zeta)$ and $y(\zeta)$. That is, the desired a posteriori joint density will be obtained with the following integration:

$$f_{x,y|\widetilde{ToA}_\ell}(x, y \mid \widetilde{ToA}_\ell, \ell = 1, 2, ..., L) = \quad (3)$$

$$\int_{-\infty}^{\infty} f_{x,y,t|\widetilde{ToA}}(x, y, t \mid \widetilde{ToA}_\ell, \ell = 1, 2, ..., L) dt.$$

The subscripts and arguments for the conditional density functions in (3) are quite long lists, making the notation cumbersome. Unfortunately, both the subscript and the argument contain essential information so neither can be omitted. The vectors defined in Table I allow the two conditional density functions in (3) to be written more compactly:

$$f_{x,y|\widetilde{ToA}}(x, y \mid \tau) = \int_{-\infty}^{\infty} f_{x,y,t|\widetilde{ToA}}(x, y, t \mid \tau) dt. \quad (4)$$

Note that the vector $\widetilde{ToA}(\zeta) = [\widetilde{ToA}_1(\zeta), ..., \widetilde{ToA}_L(\zeta)]^T$ has been shortened to the vector $\tau$ in (4) to make the notation even more compact.

The a posteriori density on the right side of (4) is obtained using Bayes theorem, which is $$f_{x,y,t|\widetilde{ToA}}(x, y, t \mid \tau) = \frac{f_{\widetilde{ToA}|x,y,t}(\tau \mid x, y, t) f_{x,y,t}(x, y, t)}{f_{\widetilde{ToA}}(\tau)}, \quad (5)$$

where $f_{x,y,t}(x,y,t)$ is the a priori joint density and, from the theorem of total probability, $$f_{\widetilde{ToA}}(\tau) = \int_{-\infty}^{\infty}\int_{-\infty}^{\infty}\int_{-\infty}^{\infty} f_{\widetilde{ToA}|x,y,t}(\tau \mid x, y, t) f_{x,y,t}(x, y, t) dt dx dy.$$

Since $t(\zeta)$ is independent of $x(\zeta)$ and $y(\zeta)$, $f_{x,y,t}(x,y,t) = f_{x,y}(x,y) f_t(t)$ and since $t(\zeta)$ is zero-mean Gaussian with variance $\sigma_{large}^2$ that tends to $\infty$, $f_t(t)$ will be constant over the region of t where $f_{\widetilde{ToA}|x,y,t}(\tau|x,y,t)$ is essentially non-zero. Since $f_t(t)$ is essentially constant, it can be taken outside the triple integral, where it will cancel the same term in the numerator. Removing $f_t(t)$ from both the numerator and denominator simplifies (5) to $$f_{x,y,t|\widetilde{ToA}}(x, y, t \mid \tau) = \frac{f_{\widetilde{ToA}|x,y,t}(\tau \mid x, y, t) f_{x,y}(x, y)}{\int_{-\infty}^{\infty}\int_{-\infty}^{\infty}\int_{-\infty}^{\infty} f_{\widetilde{ToA}|x,y,t}(\tau \mid x, y, t) f_{x,y}(x, y) dx dy dt}, \quad (6)$$

where $f_{x,y}(x,y)$ is the a priori pdf for the co-ordinates of the target. Since $\widehat{ToA}_\ell(\zeta)$ is $ToA_\ell(\zeta)$ corrupted with independent random noise, RVs $\widehat{ToA}_\ell(\zeta)$ and $\widehat{ToA}_k(\zeta)$ are independent for $k \neq \ell$. This allows the conditional joint density on the right side of (6) to be expressed as the product of individual joint densities with the result:

$$f_{x,y,t|\widehat{ToA}}(x,y,t|\tau) = \frac{f_{x,y}(x,y)\prod_{\ell=1}^{L} f_{\widehat{ToA}_\ell|x,y,t}(\tau_\ell|x,y,t)}{\int_{-\infty}^{\infty}\int_{-\infty}^{\infty} f_{x,y}(x,y) \int_{-\infty}^{\infty}\prod_{\ell=1}^{L} f_{\widehat{ToA}_\ell|x,y,t}(\tau_\ell|x,y,t) dt dx dy}. \quad (7)$$

Now that (5) has been reformulated as (7), the $f_{\widehat{ToA}_\ell|x,y,t}(\tau_\ell|x,y,t)$ can be obtained by first finding the cumulative distribution function $F_{\widehat{ToA}_\ell|x,y,t}(\tau_\ell|x,y,t)$, which can be found using basic principles of probability.

The conditional cumulative distribution function is by definition:

$$F_{\widehat{ToA}_\ell|x,y,t}(\tau_\ell|x,y,t) = P(\{\zeta: \widehat{ToA}_\ell(\zeta) \leq \tau_\ell | x(\zeta)=x, y(\zeta)=y, t(\zeta)=t\}).$$

Substituting the right side of (18) for $\widehat{ToA}_\ell(\zeta)$ and then substituting the given conditions into the result has $$F_{\widehat{ToA}_\ell|x,y,t}(\tau_\ell|x,y,t) = \quad (8)$$

$$P\left(\left\{\zeta: t + \frac{\sqrt{(x_\ell-x)^2+(y_\ell-y)^2}}{c} + \Delta T_\ell(\zeta) \leq \tau_\ell\right\}\right).$$

Rearranging terms in (8) produces $$F_{\widehat{ToA}_\ell|x,y,t}(\tau_\ell|x,y,t) = P\left(\left\{\zeta: \Delta T_\ell(\zeta) \leq \tau_\ell - \frac{\sqrt{(x_\ell-x)^2+(y_\ell-y)^2}}{c} - t\right\}\right)$$

$$= F_{\Delta T_\ell}(\Delta T_\ell)\Big|_{\Delta T_\ell(\zeta)=\tau_\ell-\sqrt{(x_\ell-x)^2+(y_\ell-y)^2}/c-t}$$

$$= F_{\Delta T_\ell}\left(\tau_\ell - \sqrt{(x_\ell-x)^2+(y_\ell-y)^2}/c - t\right),$$

where $F_{\Delta T_\ell}(\Delta T_\ell)$ is a zero-mean Gaussian distribution with variance $\sigma_{t_\ell}^2$.

It is clear that the conditional density function for $\widehat{ToA}_\ell(\zeta)$ is given by $$f_{\widehat{ToA}_\ell|x,y,t}(\tau_\ell|x,y,t) = f_{\Delta T_\ell}\left(\tau_\ell - \sqrt{(x_\ell-x)^2+(y_\ell-y)^2}/c - t\right) \quad (9)$$

$$= \frac{\exp\left(-\left(\tau_\ell - \sqrt{(x_\ell-x)^2+(y_\ell-y)^2}/c - t\right)^2/(2\sigma_{t_\ell}^2)\right)}{\sqrt{2\pi\sigma_{t_\ell}^2}}.$$

Substituting (9) into (7) and canceling the term $(2\pi\sigma_{t_\ell}^2)^{-1/2}$ in both the numerator and denominator produces $$f_{x,y,t|\widehat{ToA}}(x,y,t|\tau) = \quad (10)$$

$$\frac{f_{x,y}(x,y)\prod_{\ell=1}^{L}\exp\left(\frac{-(\mu_\ell-t)^2}{2\sigma_{t_\ell}^2}\right)}{\int_{-\infty}^{\infty}\int_{-\infty}^{\infty} f_{x,y}(x,y) \int_{-\infty}^{\infty}\prod_{\ell=1}^{L}\exp\left(\frac{-(\mu_\ell-t)^2}{2\sigma_{t_\ell}^2}\right) dt dx dy},$$

where $\mu_\ell = \tau_\ell - \sqrt{(x_\ell-x)^2+(y_\ell-y)^2}/c$.

The conditional joint density for $x(\zeta)$ and $y(\zeta)$, i.e. $f_{x,y|\widehat{ToA}}(x,y|\tau)$, is obtained by integrating (10) with respect to $t$ from $-\infty$ to $\infty$. Only the numerator is a function of $t$ and needs to be integrated. The numerator, which is also the integrand in the denominator, is an exponential function with exponent $$\sum_{\ell=1}^{L} \frac{-(t-\mu_\ell)^2}{2\sigma_{t_\ell}^2}.$$

Since this exponent is the sum of quadratics in $t$, it must be a quadratic in $t$. This means that the integration with respect to $t$ can be performed symbolically. To this end, the exponent is manipulated into the form $$-\frac{(t-\mu)^2}{2\sigma^2} - \frac{1}{2}\gamma,$$

where $\mu$, $\sigma^2$, and $\gamma$ are not functions of $t$. This is accomplished as follows:

$$g(t) = \sum_{\ell=1}^{L} \frac{-(t-\mu_\ell)^2}{2\sigma_{t_\ell}^2}$$

$$= -\frac{1}{2}\left[\sum_{\ell=1}^{L}\frac{t^2}{\sigma_{t_\ell}^2} - 2\sum_{\ell=1}^{L}\frac{\mu_\ell t}{\sigma_{t_\ell}^2} + \sum_{\ell=1}^{L}\frac{\mu_\ell^2}{\sigma_{t_\ell}^2}\right]$$

$$= -\frac{1}{2\sigma^2}\left[t^2 - 2\sigma^2\sum_{\ell=1}^{L}\frac{\mu_\ell t}{\sigma_{t_\ell}^2} + \sigma^2\sum_{\ell=1}^{L}\frac{\mu_\ell^2}{\sigma_{t_\ell}^2}\right]$$

$$= -\frac{1}{2\sigma^2}[(t-\mu)^2] - \frac{1}{2}\gamma,$$

where $$\frac{1}{\sigma^2} = \sum_{\ell=1}^{L}\frac{1}{\sigma_{t_\ell}^2}, \quad (11)$$

$$\mu = \sigma^2\left(\sum_{\ell=1}^{L}\frac{\tau_\ell - \sqrt{(x_\ell-x)^2+(y_\ell-y)^2}/c}{\sigma_{t_\ell}^2}\right), \text{ and}$$

$$\gamma = \sum_{\ell=1}^{L}\frac{\left(\tau_\ell - \sqrt{(x_\ell-x)^2+(y_\ell-y)^2}/c\right)^2}{\sigma_{t_\ell}^2} -$$

-continued $$\sigma^2\left(\sum_{\ell=1}^{L}\frac{\tau_\ell-\sqrt{(x_\ell-x)^2+(y_\ell-y)^2}/c}{\sigma_{\tau_\ell}^2}\right)^2.$$

Then the integration with respect to t is quite simple since it is well known that $$\int_{-\infty}^{\infty}e^{-\frac{(t-\mu)^2}{2\sigma^2}}dt=\sqrt{2\pi\sigma^2}.$$

Integrating both the numerator and denominator in the right side of (10) with respect to t has $$f_{x,y|\text{ToA}}(x,y\mid\tau)= \tag{12}$$

$$\frac{\sqrt{2\pi\sigma^2}\,e^{-\frac{\gamma}{2}}f_{x,y}(x,y)}{\int_{-\infty}^{\infty}\int_{-\infty}^{\infty}\sqrt{2\pi\sigma^2}\,e^{-\frac{\gamma}{2}}f_{x,y}(x,y)dxdy}=\frac{e^{-\frac{\gamma}{2}}f_{x,y}(x,y)}{\int_{-\infty}^{\infty}\int_{-\infty}^{\infty}e^{-\frac{\gamma}{2}}f_{x,y}(x,y)dxdy}.$$

Note that the denominator on the right side of (12) is a constant that makes the volume under $\exp(-\gamma/2)f_{x,y}(x,y)$ equal to 1. The double integral that produces the constant will most likely have to be performed numerically.

Before closing this section, we shall comment on how to obtain point estimates from (12). However, it should be pointed out at the outset that ending the analysis with comments on MMSE, MAP and ML estimators does not imply that was the main objective of the paper and the a posteriori pdf was found solely as a means to obtain the MMSE and MAP or ML estimates. In fact, the a posteriori pdf is of far more value than any point estimate as it can be used to compute the probability of any credible region.

The MMSE estimate for $x(\zeta)$ given the observation $\tau$ of $\overline{\text{ToA}}(\zeta)$ is the conditional mean:

$$x_{MMSE}(\zeta)=\mathbb{E}[x(\zeta)\mid\tau]=\int_{-\infty}^{\infty}x\int_{-\infty}^{\infty}f_{x,y|\text{ToA}}(x,y\mid\tau)dydx. \tag{13}$$

Substituting (12) for the conditional joint density produces $$x_{MMSE}(\zeta)=\frac{\int_{-\infty}^{\infty}x\int_{-\infty}^{\infty}e^{-\frac{\gamma}{2}}f_{x,y}(x,y)dydx}{\int_{-\infty}^{\infty}\int_{-\infty}^{\infty}e^{-\frac{\gamma}{2}}f_{x,y}(x,y)dydx}, \tag{14}$$

where $f_{x,y}(x,y)$ is the a priori pdf and $\gamma$ is given in (11). The MMSE estimate for $y(\zeta)$ is obtained in the same way.

Unfortunately, the integrals on the right sides of (14) are extremely difficult if not impossible to evaluate symbolically and most likely will have to be done numerically.

However, maximum a posteriori (MAP) estimates can be obtained without numerical integration. They are the values of x and y that jointly maximizes (12). In the special case where the a priori joint density $f_{x,y}(x,y)$ is constant over the region of x and y where $$e^{-\frac{\gamma}{2}}$$

is non-zero, it can be taken outside the double integration in the denominator and cancel with the same term in the numerator. In this case $$e^{-\frac{\gamma}{2}}$$

is both the MAP function and ML function for $x(\zeta)$ and $y(\zeta)$ and the MAP estimator is also the ML estimator.

Since $e^{-\gamma/2}$ is monotonic increasing with $-\gamma$, the values of x and y that maximize $$e^{-\frac{\gamma}{2}}$$

also maximize $-\gamma$. Therefore, the ML estimates are the values of x and y that maximize $-\gamma$, or minimize $\gamma$. Since $\gamma$ is a complicated function of x and y, the ML estimates for $x(\zeta)$ and $y(\zeta)$ are found numerically using a hill climbing or valley descending algorithm.

Extension to 3D Localization

Having completed the 2D analysis, it is straightforward to extend (12) to apply to a 3-dimensional space where the gateways and target have 3 co-ordinates. Let z be the third coordinate of the target's location and $z_\ell$, $\ell=1,2,\ldots,L$, be the third co-ordinates of the gateways' locations. Then the 3-dimensional a posteriori density function is given as $$f_{x,y,z|\text{ToA}}(x,y,z\mid\tau)=\frac{e^{-\frac{\gamma}{2}}f_{x,y,z}(x,y,z)}{\int_{-\infty}^{\infty}\int_{-\infty}^{\infty}\int_{-\infty}^{\infty}e^{-\frac{\gamma}{2}}f_{x,y,z}(x,y,z)dxdydz}, \tag{15}$$

where $f_{x,y,z}(x,y,z)$ is the a priori density of the target's co-ordinates and, for the 3-dimensional space, $\gamma$ is now given by $$\gamma=\sum_{\ell=1}^{L}\frac{\left(\tau_\ell-\sqrt{(x_\ell-x)^2+(y_\ell-y)^2+(z_\ell-z)^2}/c\right)^2}{\sigma_{\tau_\ell}^2}-$$

$$\sigma^2\left(\sum_{\ell=1}^{L}\frac{\tau_\ell-\sqrt{(x_\ell-x)^2+(y_\ell-y)^2+(z_\ell-z)^2}/c}{\sigma_{\tau_\ell}^2}\right)^2.$$

It is very important to point out that, while (15) provides a 3-dimensional a posteriori pdf, it also provides a 2-dimensional a posteriori pdf that is better than (12). In general, Equation (15) is reduced to two dimensions by setting z to be a function of x and y. Therefore, (15) can generate a 2-dimensional a posteriori pdf for a target that is known to sit on a surface that can be expressed as a function of x and y. In fact, it can be reduced to (12) by setting z as well the vertical coordinates of all gateways to 0. However, leaving the vertical coordinates of the gateways as their true heights will generate a more accurate 2-dimensional a posteriori pdf than (12). The reason is that by assuming all the gateways are in the same horizontal plane introduces a bias in the time-of-flight equations and thereby into the estimates.

Considering Errors in the Measured Locations of Gateways

The developments in previous sections assume that the locations of the receiving gateways were known precisely. This section extends the analysis to include measurement errors in the locations of the L gateways. First the two dimensional case is analyzed then the results are extended to three dimensions.

We introduce random variables $\hat{x}_\ell(\zeta)$, $\hat{y}_\ell(\zeta)$, $\Delta x_\ell(\zeta)$ and $\Delta y_\ell(\zeta)$, where $\hat{x}_\ell(\zeta)$ and $\hat{y}_\ell(\zeta)$ represent the measurements of gateway $\ell$'s coordinates and $\Delta x_\ell(\zeta)$ and $\Delta y_\ell(\zeta)$ are the measurement errors so that for observation $\zeta$ $$\hat{x}_\ell = \hat{x}_\ell(\zeta) = x_\ell + \Delta x_\ell(\zeta) \text{ and } \hat{y}_\ell = \hat{y}_\ell(\zeta) = y_\ell + \Delta y_\ell(\zeta).$$

where $(x_\ell, y_\ell)$ are the true coordinates of gateway $\ell$. Note that, in keeping with our notation, observations of the random variables $\hat{x}_\ell(\zeta)$ and $\hat{y}_\ell(\zeta)$ are shortened from $\hat{x}_\ell(\zeta)$ and $\hat{y}_\ell(\zeta)$ to $\hat{x}_\ell$ and $\hat{y}_\ell$.

Define $\hat{g}_x = [\hat{x}_1, \hat{x}_2, \ldots, \hat{x}_L]^T$ and $\hat{g}_y = [\hat{y}_1, \hat{y}_2, \ldots L, \hat{y}_L]^T$ as vectors containing the measurements of the L gateways' x, y coordinates, respectively. As was done in previous sections, the a posteriori density $f_{x,y,t|\text{ToA},\hat{g}_x,\hat{g}_y}(x,y,t|\tau,\hat{g}_x,\hat{g}_y)$ is found first and then is integrated with respect to t. The Bayes equation of interest is $$f_{x,y,t|\text{ToA},\hat{g}_x,\hat{g}_y}(x, y, t \mid \tau, \hat{g}_x, \hat{g}_y) = \frac{\text{Numerator}}{\text{Denominator}},$$

where Numerator is the product $$f_{\text{ToA},\hat{g}_x,\hat{g}_y}(\tau|_{x,y,t}(\tau|\hat{g}_x,\hat{g}_y)f_{x,y,t}(x,y,t) \quad (16)$$

with the latter pdf being the a priori pdf and Denominator is given by the triple integral of the Numerator, i.e., $\iiint_{-\infty}^{\infty}$ Numerator dxdydt.

The laws of conditional probability can be used to express the conditional probability in Numerator $$f_{\text{ToA}|x,y,t,\hat{g}_x,\hat{g}_y}(\tau|x,y,t,\hat{g}_x,\hat{g}_y)f_{\hat{g}_x,\hat{g}_y|x,y,t}(\hat{g}_x,\hat{g}_y|x,y,t).$$

Since the random variables in $\hat{g}_x$ and $\hat{g}_y$ are independent of $x(\zeta)$, $y(\zeta)$ and $t(\zeta)$, $f_{\hat{g}_x,\hat{g}_y|x,y,t}(\hat{g}_x,\hat{g}_y|x,y,t)$ does not depend on x, y or t and can be taken outside the triple integral in Denominator and cancel the same term in Numerator.

Cancelling the terms allows the numerator to be expressed as $$\text{Numerator} = f_{\text{ToA}|x,y,t,\hat{g}_x,\hat{g}_y}(\tau|x,y,t,\hat{g}_x,\hat{g}_y)f_{x,y,t}(x,y,t) \quad (16)$$

providing the denominator is now the triple integral of Numerator as defined above.

The conditional density on the right side of (16) is a function $\tau$, which is a vector containing the measured times-of-arrivals at the L gateways. The measured ToA for gateway $\ell$ is given by $$\text{ToA}_\ell(\zeta) = \text{ToA}_\ell(\zeta) + \Delta T^\ell(\zeta) \quad (17)$$

where, from physics.

$$\text{ToA}_\ell(\zeta) = \sqrt{(x(\zeta) - x_\ell)^2 + (y(\zeta) - y_\ell)^2}/c + t(\zeta) \quad (18)$$

with c being the speed of light and $\Delta T^\ell(\zeta)$ being the measurement error on the time-of-arrival at gateway $\ell$, $\Delta T_\ell(\zeta)$ is assumed to be independent of all other random variables and have zero-mean Gaussian distribution with variance $\sigma_{t_\ell}^2$.

In the scenario under study the co-ordinates of gateway $\ell$, $(x_\ell, y_\ell)$ are unknown, but are measured with the measurement errors being denoted $\Delta x_\ell(\zeta)$ and $\Delta y_\ell(\zeta)$. Both $\Delta x_\ell(\zeta)$ and $\Delta y_\ell(\zeta)$ are assumed to be independent of all other random variables an have zero-mean Gaussian distributions with variances $\sigma_{x_\ell}^2$ and $\sigma_{y_\ell}^2$, respectively. The measured random variables are given by $$\hat{x}_\ell(\zeta) = x_\ell + \Delta x_\ell(\zeta) \text{ and } \hat{y}_\ell(\zeta) = y_\ell + \Delta y_\ell(\zeta),$$

which makes them independent Gaussian random variables with means $x_\ell$ and $y_\ell$ and variances $\sigma_{x_\ell}^2$ and $\sigma_{y_\ell}^2$, respectively The expression for random variable $\text{ToA}_\ell(\zeta)$ is transformed to a function of the measured random variables by substituting $\hat{x}_\ell(\zeta) - \Delta x_\ell(\zeta)$ and $\hat{y}_\ell(\zeta) - \Delta y_\ell(\zeta)$ for $x_\ell$ and $y_\ell$, respectively, in (18). This has $$\text{ToA}_\ell(\zeta) = t(\zeta) + \frac{\sqrt{(x(\zeta) - \hat{x}_\ell(\zeta) - \Delta x_\ell(\zeta))^2 + (y(\zeta) - \hat{y}_\ell(\zeta) - \Delta y_\ell(\zeta))^2}}{c}.$$

Clearly $\text{ToA}_\ell(\zeta)$ is a non-linear function of $\Delta x_\ell(\zeta)$ and $\Delta y_\ell(\zeta)$. To move forward in the analysis the equation is linearized in $\Delta x_\ell(\zeta)$ and $\Delta y_\ell(\zeta)$ using the first-order Maclaurin polynomial to get the approximation $$\text{ToA}_\ell(\zeta) \approx t(\zeta) + \frac{\sqrt{(x(\zeta) - \hat{x}_\ell(\zeta))^2 + (y(\zeta) - \hat{y}_\ell(\zeta))^2}}{c} + \frac{(x(\zeta) - \hat{x}_\ell(\zeta))\Delta x_\ell(\zeta)}{c\sqrt{(x(\zeta) - \hat{x}_\ell(\zeta))^2 + (y(\zeta) - \hat{y}_\ell(\zeta))^2}} + \frac{(y(\zeta) - \hat{y}_\ell(\zeta))\Delta y_\ell(\zeta)}{c\sqrt{(x(\zeta) - \hat{x}_\ell(\zeta))^2 + (y(\zeta) - \hat{y}_\ell(\zeta))^2}}. \quad (19)$$

An upper bound on the error in the first-order Maclaurin polynomial approximation can be found. For the set of measurements produced by outcome $\zeta$ this bound implies the relative error in the second term on the right side of (19), which is the term due to $\Delta x_\ell(\zeta)$, and the relative error in the third term on the right side of (19), which is the term due to $\Delta y_\ell(\zeta)$, are bounded $\Delta y_\ell$ $$\frac{|e_{x_\ell}^{(max)}(\zeta)|}{|\text{Second Term}|} \leq \frac{|\Delta x_\ell(\zeta)|}{2|x(\zeta) - \hat{x}_\ell(\zeta)|}$$

and

-continued $$\frac{|e_{x_\ell}^{(max)}(\zeta)|}{|\text{Third Term}|} \le \frac{|\Delta y_\ell(\zeta)|}{2|y(\zeta) - \hat{y}_\ell(\zeta)|},$$

respectively, under the restriction that the spacing between the target and each gateway $\ell$ satisfies the inequalities $$|x(\zeta) - \hat{x}_\ell(\zeta)| > (2+\sqrt{2})|\Delta x_\ell(\zeta)|$$

and $$|y(\zeta) - \hat{y}_\ell(\zeta)| > (2+\sqrt{2})|\Delta y_\ell(\zeta)|.$$

As before, a necessary step toward finding the a posterior pdf is finding the conditional distribution function, which in this case is $F_{\widehat{\text{ToA}}_\ell|x,y,t,\hat{x}_\ell,\hat{y}_\ell}(\tau_\ell|x,y,t,\hat{x}_\ell,\hat{y}_\ell)$. This conditional distribution is, by definition, $F_{\widehat{\text{ToA}}_\ell|x,y,t,\hat{x}_\ell,\hat{y}_\ell}$ $$P(\{\zeta: \widehat{\text{ToA}}_\ell(\zeta) \le \tau_\ell | x,y,t, \hat{x}_\ell, \hat{y}_\ell\}).$$

Substituting the right side of (17) for $\widehat{\text{ToA}}_\ell(\zeta)$ then substituting the right side of approximation (19) for $\text{ToA}_\ell(\zeta)$ provides the approximation $$F_{\widehat{\text{ToA}}_\ell|\tau,x,t,\hat{x},\hat{y}}(\tau_\ell|x,y,t,\hat{x}_\ell,\hat{y}_\ell) \approx \quad (20)$$

$$P\left(\left\{\zeta: t(\zeta) + \text{sum}_\ell(\zeta) + \frac{\sqrt{(x(\zeta)-\hat{x}_\ell(\zeta))^2 + (y(\zeta)-\hat{y}_\ell(\zeta))^2}}{c} \le \tau_\ell|x,y,t,\hat{x}_\ell,\hat{y}_\ell\right\}\right) \approx$$

$$P\left(\left\{\zeta: \text{sum}_\ell(\zeta) \le \tau_\ell - \frac{\sqrt{(x-\hat{x}_\ell)^2 + (y-\hat{y}_\ell)^2}}{c} - t\right\}\right)$$

where $$\text{sum}_\ell(\zeta) + \frac{(x-\hat{x}_\ell)\Delta x_\ell(\zeta)}{c\sqrt{(x-\hat{x}_\ell)^2 + (y-\hat{y}_\ell)^2}} + \frac{(y-\hat{y}_\ell)\Delta y_\ell(\zeta)}{c\sqrt{(x-\hat{x}_\ell)^2 + (y-\hat{y}_\ell)^2}} + \Delta T_\ell(\zeta).$$

Since $\text{sum}_\ell(\zeta)$ is the sum of three independent zero-mean Gaussian random variables, it will be a zero-mean Gaussian random variable with a variance that is equal to the sum of the variances of the three random variables. Therefore, the variance of $\text{sum}_\ell(\zeta)$ is $$\sigma_{\text{sum}_\ell}^2 = \frac{(x-\hat{x}_\ell)^2 \sigma_{x_\ell}^2 + (y-\hat{y}_\ell)^2 \sigma_{y_\ell}^2}{c^2((x-\hat{x}_\ell)^2 + (y-\hat{y}_\ell)^2)} + \sigma_{t_\ell}^2.$$

Clearly, if $\sigma_{x_\ell}^2 = \sigma_{y_\ell}^2$, then $\sigma_{\text{sum}_\ell}^2$ does not depend on the location of the target relative to the gateways and $$\sigma_{\text{sum}_\ell}^2 = \sigma_{x_\ell}^2 + \sigma_{t_\ell}^2 \text{ for } \sigma_{x_\ell}^2 = \sigma_{y_\ell}^2.$$

Also, if $\sigma_{x_\ell}^2 \ne \sigma_{y_\ell}^2$, then $\sigma_{\text{sum}_\ell}^2$ is bounded by $$\sigma_{\text{sum}_\ell}^2 \le \max(\sigma_{x_\ell}^2, \sigma_{y_\ell}^2) + \sigma_{t_\ell}^2,$$

which becomes an equality if $\sigma_{x_\ell}^2 = \sigma_{y_\ell}^2$.

Therefore, from (20), since $\text{sum}_\ell(\zeta)$ has a Gaussian distribution the conditional density is approximately $$f_{\widehat{\text{ToA}}_\ell|x,y,t,\hat{x},\hat{y}}(\tau_\ell|x,y,t,\hat{x}_\ell,\hat{y}_\ell) \approx$$

$$\frac{\exp\left(-\left(\tau_\ell - \sqrt{(x-\hat{x}_\ell)^2+(y-\hat{y}_\ell)^2}/c - t\right)^2 / (2\sigma_{\text{sum}_\ell}^2)\right)}{\sqrt{2\pi\sigma_{\text{sum}_\ell}^2}}$$

which means it is approximately Gaussian with a mean of $\sqrt{(x-\hat{x}_\ell)^2+(y-\hat{y}_\ell)^2}/c+t$ and a variance of $\sigma_{\text{sum}_\ell}^2$.

This conditional density is that of (9) with $x_\ell$ replaced with $\hat{x}_\ell$, $y_\ell$ replaced with $\hat{y}_\ell$ and $\sigma_{t_\ell}$ replaced with $\sigma_{\text{sum}_\ell}$. Therefore, following the same steps as before and then extending the result to three dimensions, the following approximation for the a posteriori pdf is obtained:

$$f_{x,y,z|\widehat{\text{ToA}},\hat{g}_x,\hat{g}_y,\hat{g}_z}(x,y,z|\tau,\hat{g}_x,\hat{g}_y,\hat{g}_z) \approx \frac{e^{-\frac{\gamma}{2}} f_{x,y,z}(x,y,z)}{\iiint_{-\infty}^{\infty} e^{-\frac{\gamma}{2}} f_{x,y,z}(x,y,z)dxdydz}$$

where $f_{x,y,z}(x,y,z)$ is the a priori pdf, $$\gamma = \sum_{\ell=1}^{L} \frac{\left(\tau_\ell - \sqrt{(x-\hat{x}_\ell)^2+(y-\hat{y}_\ell)^2+(z-\hat{z}_\ell)^2}/c\right)^2}{\sigma_{\text{sum}_\ell}^2} - \quad (21)$$

$$\left(\sum_{\ell=1}^{L} \frac{\tau_\ell - \sqrt{(x-\hat{x}_\ell)^2+(y-\hat{y}_\ell)^2+(z-\hat{z}_\ell)^2}/c}{\sigma_{\text{sum}_\ell}^2}\right)^2 /$$

$$\sum_{\ell=1}^{L} \frac{1}{\sigma_{\text{sum}_\ell}^2}$$

and $$\sigma_{\text{sum}_\ell}^2 = \frac{(x-\hat{x}_\ell)^2 \sigma_{x_\ell}^2 + (y-\hat{y}_\ell)^2 \sigma_{y_\ell}^2 + (z-\hat{z}_\ell)^2 \sigma_{z_\ell}^2}{c^2((x-\hat{x}_\ell)^2 + (y-\hat{y}_\ell)^2)} + \sigma_{t_\ell}^2.$$

Note that if $\sigma_{x_\ell}^2 = \sigma_{y_\ell}^2 = \sigma_{z_\ell}^2$ then $\sigma_{\text{sum}_\ell}^2 = \sigma_{x_\ell}^2 + \sigma_{t_\ell}^2$, which means it is known exactly. Otherwise, either a worst case or an approximate value must be used for $\sigma_{\text{sum}_\ell}^2$. The worst case is $\sigma_{\text{sum}_\ell}^2 = \max(\sigma_{x_\ell}^2, \sigma_{y_\ell}^2, \sigma_{z_\ell}^2) + \sigma_{t_\ell}^2$. An approximate value is obtained by substituting approximate MMSE estimates for x, y and z in (21). Approximate MMSE estimates can be obtained by taking the mean of an approximate a posteriori pdf, which is the pdf given by (??) with $\sigma_{\text{sum}_\ell}^2$ being either its best case value, i.e., $\sigma_{t_\ell}^2$ or its worst case value or some value between them.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining time of arrival measurements associated with reception, at a plurality of receiver devices at known or measured locations, of one or more wireless transmissions made by a target device at a location that is unknown;
based on the time of arrival measurements, computing a joint probability density function that is descriptive of a probability that the target device is within any specified region; and
applying the joint probability density function to a particular specified region to compute the probability that the location of the target device is within the particular specified region.

2. The method of claim 1, wherein the joint probability density function is an a posteriori probability density function.

3. The method of claim 1, wherein applying the joint probability density function to a particular specified region comprises integrating the joint probability density function over a domain that defines the particular specified region.

4. The method of claim 3, wherein the domain that defines the particular specified region corresponds to a range of values of one or more of x, y and z coordinates.

5. The method of claim 1, further comprising:
(a) obtaining a maximum a posteriori (MAP) estimate of the location, which corresponds to a peak of the joint probability density function; or
(b) obtaining a minimum mean squared error (MMSE) estimate, which corresponds to a center of mass of the joint probability density function; or
(c) obtaining a maximum likelihood (ML) estimate, which corresponds to a location of the peak of the joint probability density function in a special case that prior to the one or more wireless transmissions by the target device, no information on the location of the target device was available.

6. The method of claim 1, wherein obtaining the time of arrival measurements comprises obtaining the time of arrival measurements for a plurality of wireless transmissions made by the target device over time, and wherein computing the joint probability density function comprises updating the joint probability density function for each of the plurality of wireless transmissions.

7. The method of claim 1, further comprising generating a map showing a plurality of regions and including indications of a probability that the target device is within a corresponding one of each of the plurality of regions.

8. The method of claim 1, wherein the one or more wireless transmissions from the target device are chirp spread spectrum transmissions.

9. The method of claim 1, wherein the one or more wireless transmissions are formatted in accordance with the LoRaWAN protocol.

10. The method of claim 1, wherein the target device is associated with one or more of: an object, a person, an animal or a vehicle.

11. The method of claim 1, wherein the particular specified region identifies a restricted region, and further comprising:

generating an alert when the probability that the target device is in the particular specified region is greater than a threshold.

12. The method of claim 1, further comprising:
generating an alert when the probability that the target device is outside the particular specified region is greater than or less than a threshold.

13. A system comprising:
a plurality of receiver devices at known or measured locations, and configured to generate time of arrival measurements associated with reception of one or more wireless transmissions made by a target device at a location that is unknown;
a server configured to be in network communication with the plurality of receiver devices, and to receive the time of arrival measurements from the plurality of receiver devices, wherein the server is configured to:
based on the time of arrival measurements, compute a joint probability density function that is descriptive of a probability that the target device is within any specified region; and
apply the joint probability density function to a particular specified region to compute the probability that the location of the target device is in the particular specified region.

14. The system of claim 13, wherein the server is configured to apply the joint probability density function to a particular specified region by integrating the joint probability density function over a domain that defines the particular specified region.

15. The system of claim 14, wherein the domain that defines the particular specified region corresponds to a range of values of one or more of x, y and z coordinates.

16. The system of claim 13, wherein the server is configured to obtain the time of arrival measurements for a plurality of wireless transmissions made by the target device over time, and to update the joint probability density function for each of the plurality of wireless transmissions.

17. The system of claim 13, wherein the server is further configured to:
generate an alert when the probability that the target device is in the particular specified region is greater than a threshold; or
generating an alert when the probability that the target device is outside the particular specified region is greater than or less than a threshold.

18. One or more non-transitory computer readable storage media encoded with instructions that, when executed by one or more processors, cause the one or more processors to perform operations including:
obtaining time of arrival measurements associated with reception, at a plurality of receiver devices at known or measured locations, of one or more wireless transmissions made by a target device at a location that is unknown;
based on the time of arrival measurements, computing a joint probability density function that is descriptive of a probability that the target device is within any specified region; and
applying the joint probability density function to a particular specified region to compute the probability that the location of the target device is within the particular specified region.

19. The one or more non-transitory computer readable storage media of claim 18, wherein the instructions cause the one or more processors to perform the applying by integrating the joint probability density function over a domain that defines the particular specified region.

20. The one or more non-transitory computer readable storage media of claim 19, wherein the domain that defines the particular specified region corresponds to a range of values of one or more of x, y and z coordinates.

* * * * *